(12) United States Patent
Hemphill et al.

(10) Patent No.: US 11,185,948 B2
(45) Date of Patent: Nov. 30, 2021

(54) LASER DRILLING OF METAL FOILS FOR ASSEMBLY IN AN ELECTROLYTIC CAPACITOR

(71) Applicant: Pacesetter, Inc., Santa Clara, CA (US)

(72) Inventors: Ralph Jason Hemphill, Sunset, SC (US); David R. Bowen, Taylors, SC (US); Kurt J. Erickson, Anderson, SC (US); Peter Fernstrom, Easley, SC (US)

(73) Assignee: Pacesetter, Inc., Santa Clara, CA (US)

( * ) Notice: Subject to any disclaimer, the term of this patent is extended or adjusted under 35 U.S.C. 154(b) by 832 days.

(21) Appl. No.: 15/952,469

(22) Filed: Apr. 13, 2018

(65) Prior Publication Data
US 2019/0111521 A1    Apr. 18, 2019

Related U.S. Application Data

(62) Division of application No. 15/153,369, filed on May 12, 2016, now Pat. No. 9,969,030.

(51) Int. Cl.
*H01G 9/042*    (2006.01)
*H01G 9/048*    (2006.01)
(Continued)

(52) U.S. Cl.
CPC .......... *B23K 26/362* (2013.01); *B23K 26/064* (2015.10); *B23K 26/0624* (2015.10);
(Continued)

(58) Field of Classification Search
CPC ............ H01G 9/042; H01G 9/02; H01G 9/08; H01G 9/045; H01G 9/048
See application file for complete search history.

(56) References Cited

U.S. PATENT DOCUMENTS

| 3,622,843 A | 11/1971 | Vermiyea |
| 3,779,877 A | 12/1973 | Alwitt |

(Continued)

FOREIGN PATENT DOCUMENTS

| JP | 59083772 | 5/1984 |
| JP | 02075155 | 3/1990 |

(Continued)

OTHER PUBLICATIONS

Notice of Allowance dated Jan. 19, 2018; Related U.S. Appl. No. 15/153,369.

(Continued)

*Primary Examiner* — David M Sinclair

(57) ABSTRACT

A capacitor and methods of processing an anode metal foil are presented. The capacitor includes a housing, one or more anodes disposed within the housing, one or more cathodes disposed within the housing, one or more separators disposed between an adjacent anode and cathode, and an electrolyte disposed around the one or more anodes, one or more cathodes, and one or more separators within the housing. The one or more anodes each include a metal foil that includes a first plurality of tunnels through a thickness of the metal foil in a first ordered arrangement, the first ordered arrangement being a close packed hexagonal array arrangement, and having a first diameter, and a second plurality of tunnels through the thickness of the metal foil having a second ordered arrangement and a second diameter greater than the first diameter.

19 Claims, 10 Drawing Sheets

(51) Int. Cl.

| | |
|---|---|
| B23K 26/362 | (2014.01) |
| H01G 9/00 | (2006.01) |
| H01G 9/008 | (2006.01) |
| H01G 9/045 | (2006.01) |
| H01G 9/08 | (2006.01) |
| H01G 9/02 | (2006.01) |
| B23K 26/0622 | (2014.01) |
| B23K 26/08 | (2014.01) |
| B23K 26/067 | (2006.01) |
| B23K 26/40 | (2014.01) |
| B23K 26/064 | (2014.01) |
| B23K 26/382 | (2014.01) |
| H01G 9/055 | (2006.01) |
| H01G 11/30 | (2013.01) |
| H01G 9/022 | (2006.01) |
| B23K 103/10 | (2006.01) |
| B23K 101/16 | (2006.01) |
| B23K 101/18 | (2006.01) |
| B23K 101/38 | (2006.01) |

(52) U.S. Cl.

CPC ........ *B23K 26/0676* (2013.01); *B23K 26/083* (2013.01); *B23K 26/0838* (2013.01); *B23K 26/0846* (2013.01); *B23K 26/0876* (2013.01); *B23K 26/382* (2015.10); *B23K 26/40* (2013.01); *H01G 9/008* (2013.01); *H01G 9/0029* (2013.01); *H01G 9/02* (2013.01); *H01G 9/022* (2013.01); *H01G 9/042* (2013.01); *H01G 9/045* (2013.01); *H01G 9/048* (2013.01); *H01G 9/055* (2013.01); *H01G 9/08* (2013.01); *H01G 11/30* (2013.01); *B23K 2101/16* (2018.08); *B23K 2101/18* (2018.08); *B23K 2101/38* (2018.08); *B23K 2103/10* (2018.08)

(56) References Cited

U.S. PATENT DOCUMENTS

| | | | |
|---|---|---|---|
| 3,872,579 A | 3/1975 | Papadopoulos | |
| 4,213,835 A | 7/1980 | Fickelscher | |
| 4,266,332 A | 5/1981 | Markarian et al. | |
| 4,420,367 A | 12/1983 | Locher | |
| 4,474,657 A | 10/1984 | Arora | |
| 4,481,084 A | 11/1984 | Chen et al. | |
| 4,513,471 A | 5/1985 | Arora | |
| 4,525,249 A | 6/1985 | Arora | |
| 4,541,037 A | 9/1985 | Ross et al. | |
| 4,593,343 A | 6/1986 | Ross | |
| 4,663,824 A | 5/1987 | Kenmochi | |
| 4,696,082 A | 9/1987 | Fonfia | |
| 4,928,593 A | 5/1990 | Ruckl | |
| 5,131,388 A | 7/1992 | Pless et al. | |
| 5,175,227 A | 12/1992 | Gardon et al. | |
| 5,230,962 A | 7/1993 | Stephenson | |
| 5,334,815 A | 8/1994 | MacNaughton | |
| 5,427,026 A | 6/1995 | Kuwahara | |
| 5,522,841 A | 6/1996 | Roby et al. | |
| 5,522,851 A | 6/1996 | Fayram | |
| 5,602,198 A | 2/1997 | Das et al. | |
| 5,660,737 A | 8/1997 | Elias et al. | |
| 5,663,240 A | 9/1997 | Simeone et al. | |
| 5,715,133 A | 2/1998 | Harrington et al. | |
| 5,849,430 A * | 12/1998 | Lee | H01M 4/742 |
| | | | 429/94 |
| 6,168,706 B1 | 1/2001 | Hemphill et al. | |
| 6,224,738 B1 | 5/2001 | Sudduth et al. | |
| 6,426,864 B1 | 7/2002 | O'Phelan | |
| 6,621,686 B1 * | 9/2003 | Jenn-Feng | A61N 1/3956 |
| | | | 361/503 |
| 6,686,124 B1 | 2/2004 | Angelopoulos et al. | |
| 6,736,956 B1 | 5/2004 | Hemphill et al. | |
| 6,802,954 B1 | 10/2004 | Hemphill et al. | |
| 6,858,126 B1 | 2/2005 | Hemphill et al. | |
| 7,452,473 B1 | 11/2008 | Hemphill et al. | |
| 7,745,281 B2 | 6/2010 | Prymak et al. | |
| 8,535,507 B1 | 9/2013 | Hemphill et al. | |
| 8,734,964 B2 | 5/2014 | Kurihara et al. | |
| 8,888,967 B2 | 11/2014 | Hemphill et al. | |
| 9,275,800 B2 | 3/2016 | Ribble et al. | |
| 9,412,525 B2 | 8/2016 | Bowen et al. | |
| 2002/0111029 A1 | 8/2002 | Johnson | |
| 2009/0103245 A1 * | 4/2009 | Oh | H01G 9/0036 |
| | | | 361/525 |
| 2010/0035150 A1 * | 2/2010 | Ando | H01G 11/50 |
| | | | 429/209 |
| 2011/0309059 A1 | 12/2011 | Humphreys | |

FOREIGN PATENT DOCUMENTS

| | | | |
|---|---|---|---|
| JP | 04056309 | | 2/1992 |
| JP | 07049428 | | 2/1995 |
| JP | 09251926 A | * | 9/1997 |
| JP | 2008071942 A | * | 3/2008 |
| JP | 2010087290 A | * | 4/2010 |
| JP | 2010098163 A | * | 4/2010 |
| WO | 2000/019470 | | 4/2000 |

OTHER PUBLICATIONS

Non-Final Office Action dated Nov. 3, 2004; Related U.S. Appl. No. 10/680,777.
"A New Coating Process for Aluminum" by Patel et al. Posted on Oct. 25, 2000 on http://www.ceramicindustry.com. Downloaded from http://www.ceramicindustry.com/CDA/ArticleInformation/Features/BNP_Features_/Item/0,270,13647,00.html on Oct. 21, 2004.
Amendment filed Mar. 3, 2005; Related U.S. Appl. No. 10/680,777.
Final Office Action dated May 23, 2005; Related U.S. Appl. No. 10/680,777.
English translation of JP 059-083772 performed by USPTO Translator Akiko Smith.
Notice of Appeal dated Sep. 23, 2005; Related U.S. Appl. No. 10/680,777.
Amendment filed Sep. 23, 2005; Related U.S. Appl. No. 10/680,777.
Notice of Allowance dated Sep. 24, 2008; Related U.S. Appl. No. 10/940,793.
Amendment filed Aug. 28, 2008; Related U.S. Appl. No. 10/940,793.
Examiner Interview Summary dated Aug. 1, 2008; Related U.S. Appl. No. 10/940,793.
Amendment filed Jun. 30, 2008; Related U.S. Appl. No. 10/940,793.
Final Office Action dated Mar. 28, 2008; Related U.S. Appl. No. 10/940,793.
Amendment filed Jan. 7, 2008; Related U.S. Appl. No. 10/940,793.
Non-Final Office Action dated Oct. 5, 2007; Related U.S. Appl. No. 10/940,793.
Amendment filed Sep. 21, 2007; Related U.S. Appl. No. 10/940,793.
Final Office Action dated Jun. 21, 2007; Related U.S. Appl. No. 10/940,793.
Amendment filed Apr. 10, 2007; Related U.S. Appl. No. 10/940,793.
Non-Final Office Action dated Jan. 10, 2007; Related U.S. Appl. No. 10/940,793.

* cited by examiner

… (1 / 2)

LASER DRILLING OF METAL FOILS FOR ASSEMBLY IN AN ELECTROLYTIC CAPACITOR

PRIORITY

This application is a Divisional Application of U.S. patent application Ser. No. 15/153,369, filed May 12, 2016, incorporated herein by reference in its entirety to provide continuity of disclosure.

FIELD

The present invention relates generally to the field of preparing anode foils for use in electrolytic capacitors or batteries.

BACKGROUND

Compact, high voltage capacitors are utilized as energy storage reservoirs in many applications, including implantable medical devices. These capacitors are required to have a high energy density, since it is desirable to minimize the overall size of the implanted device. This is particularly true of an Implantable Cardioverter Defibrillator (ICD), also referred to as an implantable defibrillator, since the high voltage capacitors used to deliver the defibrillation pulse can occupy as much as one third of the ICD volume.

Implantable Cardioverter Defibrillators, such as those disclosed in U.S. Pat. No. 5,131,388, incorporated herein by reference, typically use two electrolytic capacitors in series to achieve the desired high voltage for shock delivery. For example, an implantable cardioverter defibrillator may utilize two 350 to 400 volt electrolytic capacitors in series to achieve a voltage of 700 to 800 volts.

Electrolytic capacitors are used in ICDs because they have the most nearly ideal properties in terms of size, reliability and ability to withstand relatively high voltage. Conventionally, such electrolytic capacitors include an etched aluminum foil anode, an aluminum foil or film cathode, and an interposed kraft paper or fabric gauze separator impregnated with a solvent-based liquid electrolyte. While aluminum is the preferred metal for the anode plates, other metals such as tantalum, magnesium, titanium, niobium, zirconium and zinc may be used. A typical solvent-based liquid electrolyte may be a mixture of a weak acid and a salt of a weak acid, preferably a salt of the weak acid employed, in a polyhydroxy alcohol solvent. The electrolytic or ion-producing component of the electrolyte is the salt that is dissolved in the solvent. The entire laminate is rolled up into the form of a substantially cylindrical body, or wound roll, that is held together with adhesive tape and is encased, with the aid of suitable insulation, in an aluminum tube or canister. Connections to the anode and the cathode are made via tabs. Alternative flat constructions for aluminum electrolytic capacitors are also known, comprising a planar, layered, stack structure of electrode materials with separators interposed therebetween, such as those disclosed in the above-mentioned U.S. Pat. No. 5,131,388.

In ICDs, as in other applications where space is a critical design element, it is desirable to use capacitors with the greatest possible capacitance per unit volume. Since the capacitance of an aluminum electrolytic capacitor is provided by the anodes, a clear strategy for increasing the energy density in the capacitor is to minimize the volume taken up by paper and cathode and maximize the number of anodes. A multiple anode stack configuration requires fewer cathodes and paper spacers than a single anode configuration and thus reduces the size of the device. A multiple anode stack consists of a number of units consisting of a cathode, a paper spacer, two or more anodes, a paper spacer and a cathode, with neighboring units sharing the cathode between them, all placed within the capacitor case.

In order to obtain higher capacitance, tunnels are often etched through the thickness of the anode metal foils. A widening process is then used to open the tunnels to prevent clogging during a later oxide formation step. Both the etch and widening processes can remove as much as 50% to 60% of the aluminum to create greater than 30 million tunnels per $cm^2$.

It is difficult to control the arrangement of the tunnels when performing the electrochemical drilling process. As such, the distribution of the etched tunnels is not uniform. In some areas, tunnels may merge into one another as they are being etched, thus reducing the overall surface area of the metal foil.

BRIEF SUMMARY

A capacitor and methods of making components of said capacitor are presented that include forming tunnels through anode or cathode metal foils using a laser. The use of a laser, as opposed, for example, to electrochemical etching, allows for greater control of the arrangement and packing density of the tunnels.

According to an embodiment, a method of forming tunnels through a metal foil for use in an electrolytic capacitor includes stretching a sheet of metal foil around a cylindrical body. A beam of light is pulsed at a first beam spot towards a portion of the metal foil stretched around the cylindrical body to form a tunnel through a thickness of the metal foil. The method also includes pulsing the beam of light at a second beam spot towards another portion of the metal foil to form another tunnel through the thickness of the metal foil. The second beam spot is displaced from the first beam spot in a first direction across the sheet of foil stretched around the cylindrical body. The method also includes moving the sheet of metal foil in a second direction around the cylindrical body, the second direction being substantially perpendicular to the first direction.

According to another embodiment, a method of processing a metal foil for use in an electrolytic capacitor includes securing a sheet of metal foil on a rotary actuator and rotating the sheet of metal foil using the rotary actuator about an axis substantially normal to a major surface of the sheet of metal foil. The method includes pulsing a beam of light at a first beam spot towards the rotating sheet of metal foil, such that successive beam pulses are received at different locations circumferentially on the metal foil. The method also includes pulsing the beam of light at a second beam spot towards the rotating sheet of metal foil, the second beam spot being radially displaced from the first beam spot.

According to an embodiment, a capacitor includes a housing, one or more anodes disposed within the housing, one or more cathodes disposed within the housing, one or more separators disposed between an adjacent anode and cathode, and an electrolyte disposed around the one or more anodes, one or more cathodes, and one or more separators within the housing. The one or more anodes each include a metal foil that includes a first plurality of tunnels through a thickness of the metal foil in a first ordered arrangement, the first ordered arrangement being a close packed hexagonal array arrangement, and having a first diameter, and a second plurality of tunnels through the thickness of the metal foil having a second ordered arrangement and a second diameter greater than the first diameter.

Further embodiments, features, and advantages of the present apparatus and method, as well as the structure and operation of the various embodiments of the present apparatus and method, are described in detail below with reference to the accompanying drawings.

BRIEF DESCRIPTION OF THE DRAWINGS/FIGURES

The accompanying drawings, which are incorporated herein and form part of the specification, illustrate the methods and systems presented herein for processing an anode metal foil. Together with the detailed description, the drawings further serve to explain the principles of and to enable a person skilled in the relevant art(s) to make and use the methods and systems presented herein. In the drawings, like reference numbers indicate identical or functionally similar elements. Further, the drawing in which an element first appears is typically indicated by the leftmost digit(s) in the corresponding reference number.

DETAILED DESCRIPTION

The following detailed description of methods and systems for processing metal anode foils refers to the accompanying drawings that illustrate exemplary embodiments consistent with these methods and systems. Other embodiments are possible, and modifications may be made to the embodiments within the spirit and scope of the methods and systems presented herein. Therefore, the following detailed description is not meant to limit the methods and systems described herein. Rather, the scope of these methods and systems is defined by the appended claims.

It would be apparent to one of skill in the art that the methods and systems for processing metal anode foils, as described below, may be implemented in many different embodiments without departing from the scope of the description below. Thus, the operation and behavior of the methods and systems will be described with the understanding that modifications and variations of the embodiments are possible, given the level of detail presented herein. It will be apparent to a person skilled in the relevant art that the methods and systems also be employed to produce porous anode foils for use in a variety of devices and applications in addition to use in an implantable cardioverter defibrillator (ICD).

Figure 1:
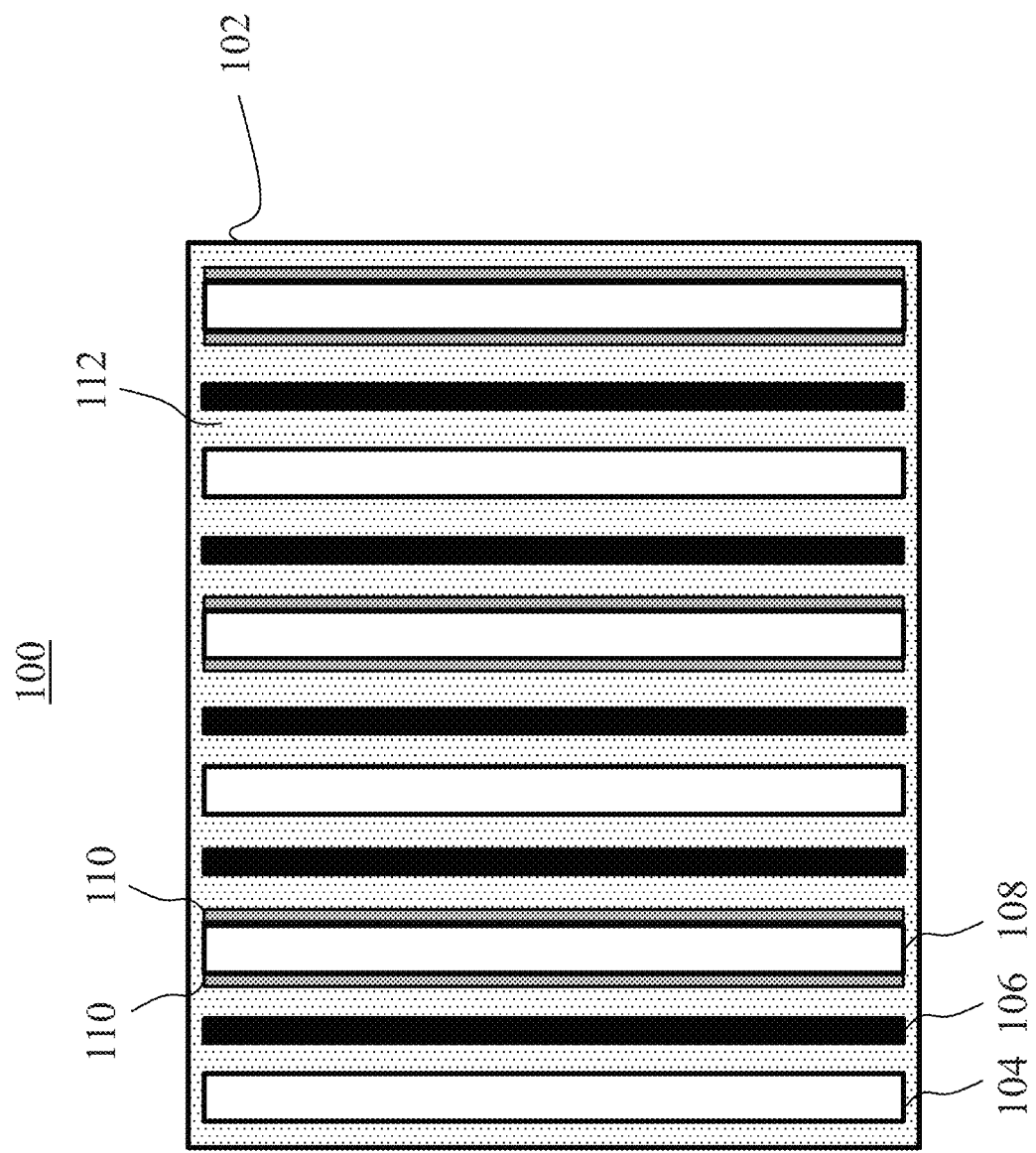
FIG. 1 illustrates a cross-section of an electrolytic capacitor or battery.

FIG. 1 illustrates a cross-sectional view of an electronic component 100. Electronic component 100 includes a housing 102 that contains a plurality of cathodes 104 alternating with a plurality of anodes 108, and separated by a plurality of separators 106. Each anode 108 includes a dielectric material 110 on or around an outer surface of anode 108. Dielectric material 110 may be an oxide that is thermally grown on, or deposited onto, the surface of anode 108. A high-k dielectric material may be used for dielectric material 110. A conductive electrolyte 112 fills the space between each of the elements within housing 102. Electrolyte 112 may be a polymer or liquid electrolyte as would be understood by one skilled in the art. Example electrolytes include ethylene glycol/boric acid based electrolytes and anhydrous electrolytes based on organic solvents such as dimethylformamide (DMF), dimethylacetamide (DMA), or gamma-butyrolactone (GBL). The plurality of cathodes 104 may be electrically connected to a single, common cathode terminal, and the plurality of anodes 108 may be similarly connected to a single, common anode terminal.

Electronic component 100 may be, for example, an electrolytic capacitor or a battery. When electronic component 100 is used as a capacitor, example materials for the plurality of cathodes 104 include aluminum, titanium, stainless steel, while example materials for the plurality of anodes 108 include aluminum and tantalum. When electronic component 100 is used as a battery, example materials for the plurality of cathodes 104 include silver vanadium oxide, carbon fluoride, magnesium oxide, or any combination thereof, while example materials for the plurality of anodes 108 include lithium metal.

Spacer 106 may be provided to maintain a given separation between each cathode 104 and an adjacent anode 108 within housing 102. Additionally, spacer 106 may be provided to prevent arcing between cathode 104 and anode 108 in spaces where dielectric 110 may be very thin or nonexistent, and/or where a void within electrolyte 112 exists between cathode 104 and anode 108.

It should be understood that the various elements and dimensions of electronic component 100 are not drawn to scale. Although each of capacitor 104, separator 106, and anode 108 are illustrated as being spaced apart from one another for the convenience of illustration and labeling, it would be understood by one skilled in the art that such elements may also be stacked together in close physical contact with one another.

A given anode 108 as illustrated in FIG. 1 may represent a stack of anode layers. For example, anode 108 may represent a stack of around five metal foils, each having a thickness between about five microns and 40 microns. Each metal foil also includes a plurality of tunnels through the thickness of the foil to increase the surface area of the anode exposed to electrolyte 112. Similarly, a given cathode 104 may represent a stack of cathode layers.

Figure 2:
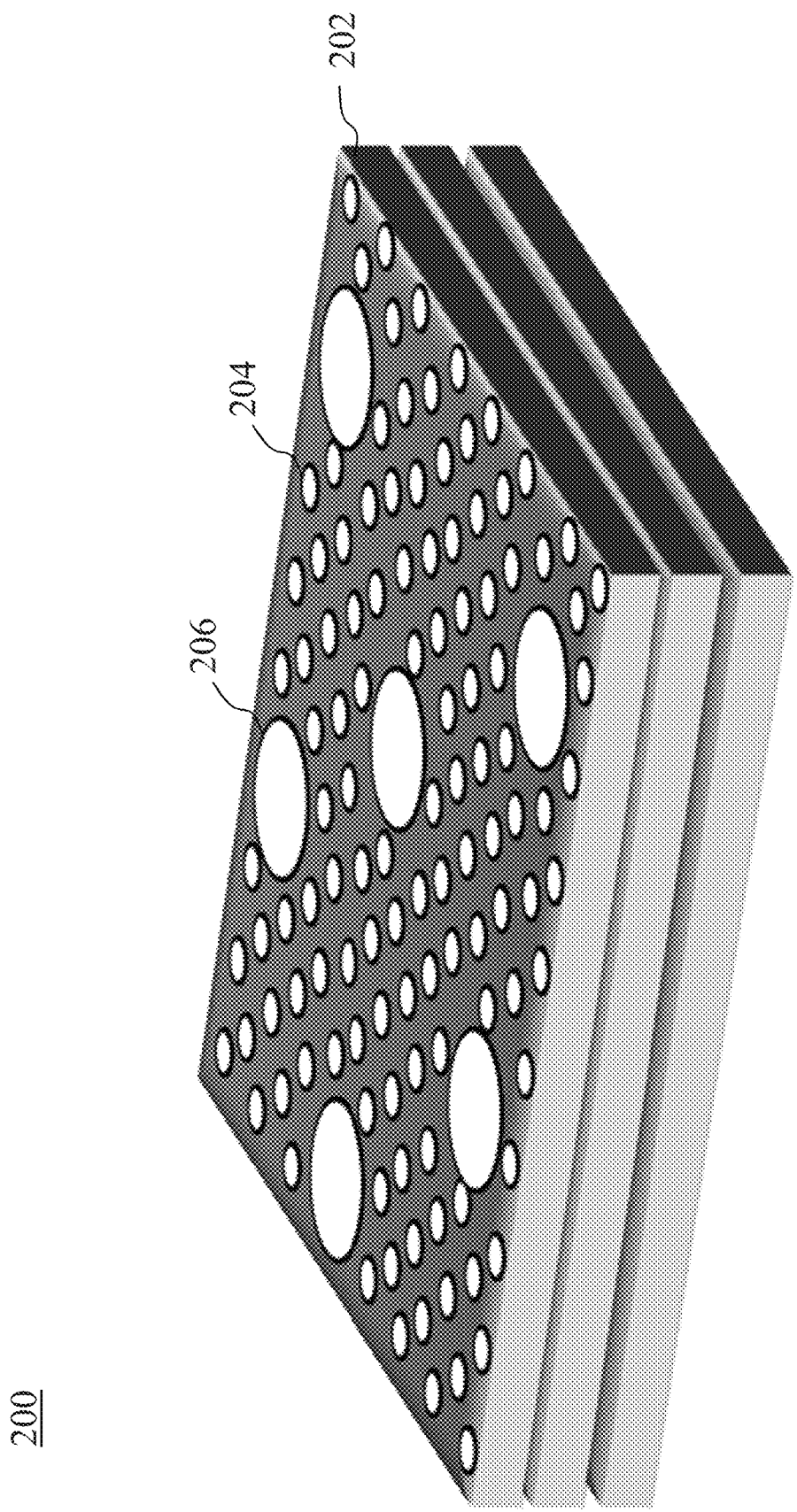
FIG. 2 illustrates a stack of metal foils having tunnels, according to an embodiment.

FIG. 2 illustrates an example anode stack 200, according to an embodiment. Anode stack 200 includes a stack of individual metal foils 202. Each metal foil 202 may be aluminum or tantalum, though other metals are possible as well. Each metal foil 202 includes a plurality of tunnels through a thickness of the metal foil. Typically, tunnels are formed using electrochemical etching methods. However, according to the embodiments described herein, these tunnels are formed via laser ablation. The laser ablation techniques allow for more precise control over tunnel placement and diameter. As used herein, the term "ablate" or "ablation" means removal of material due to interaction with a laser beam.

According to an embodiment, a first plurality of tunnels 204 may be formed through the thickness of metal foil 202. First plurality of tunnels 204 may have a diameter of between 1 μm to 3 μm when metal foil 202 is aluminum, and a diameter of between 1 μm to 5 μm when metal foil 202 is tantalum. First plurality of tunnels 204 are provided in an ordered arrangement, such as a close packed hexagonal array. Using an ordered arrangement for first plurality of tunnels 204 allows for a maximum packing density of tunnels across the surface of metal foil 202.

According to an embodiment, a second plurality of tunnels 206 are present through the thickness of metal foil 202, where the diameter of each of second plurality of tunnels 206 is greater than the diameter of each of first plurality of tunnels 204. Second plurality of tunnels 206 may have a diameter of between 5 μm to 10 μm when metal foil 202 is either aluminum or tantalum. The presence of second plurality of tunnels 206 helps to reduce the equivalent series resistance (ESR) in the capacitor. This is because the various tunnels between the various metal foils 202 of anode stack 200 may not align perfectly when the stack is formed. Having some tunnels with a larger diameter provides areas that are easier for the electrolyte to penetrate through the various layers in anode stack 200. Second plurality of tunnels 206 may also be arranged in a particular ordered arrangement, or may be randomly placed across the surface of metal foil 202.

Example Laser Source

Drilling each tunnel one at a time across the entire surface of a metal foil would be a very time consuming process. As such, embodiments herein describe arrangements and methods to form the tunnels in a controlled and timely manner. First, a brief description of the optical arrangement with the laser will be discussed.

Figure 3A:
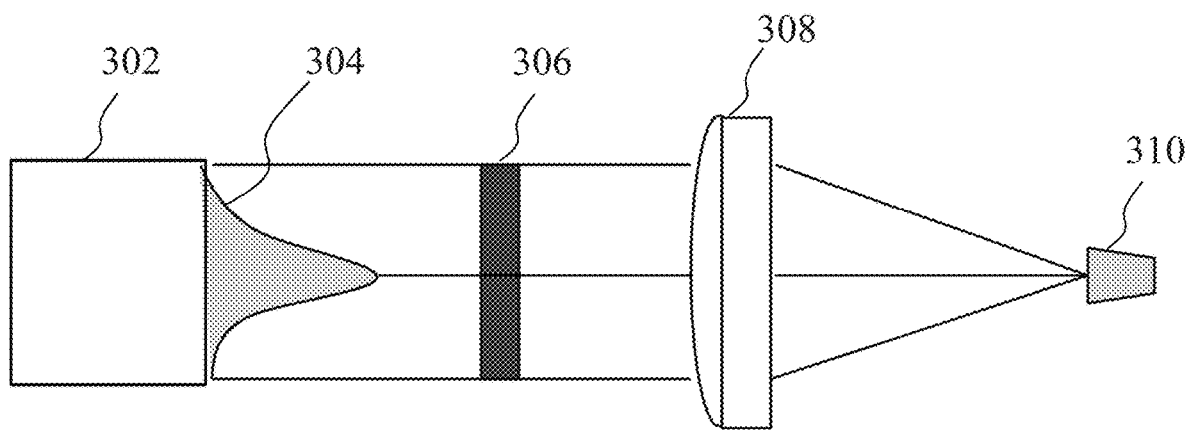
FIG. 3A illustrates an optical arrangement for generating a laser pulse, according to an embodiment.

FIG. 3A illustrates an optical arrangement 300 that includes a laser source 302, a beam shaping element 306, and a focusing element 308, according to an embodiment. Laser source 302 may include a pulsed laser having a wavelength between about 200 nm and 700 nm. Laser source 302 may be designed as an ultrashort pulse source (i.e., having a picosecond or femtosecond pulse width). In an embodiment, optical arrangement 300 is provided within a laser head that may be movable to ablate various portions of a sample. In another embodiment, only some components of optical arrangement 300 are provided within the laser head. For example, the laser head may only include focusing element 308.

Laser source 302 outputs a beam of light having a substantially Gaussian spatial profile 304. Although this beam of light may be used for ablation, it may be more difficult to control the diameter of the beam spot given the spread energy distribution of Gaussian profile 304. This is discussed in more detail later with reference to FIG. 3B.

According to an embodiment, the beam of light with Gaussian profile 304 is received by a beam shaping element 306 and converted to a beam of light having a top hat spatial profile 310. For example, the beam of light with Gaussian profile 304 may have an $M^2$ value less than 1.2 while the beam of light having top hat profile 310 may have an $M^2$ value greater than 20. The $M^2$ value is a parameter that quantifies the beam quality of a laser beam. An ideal Gaussian beam has an $M^2$ value of 1, while higher $M^2$ values have a more uniform energy profile. Beam shaping element 306 may be a fused silica diffractive optic designed to modulate the energy profile of an input Gaussian beam. One example of beam shaping element 306 is the FBSR Beam Shaper from Topag Lasertechnik.

It should be understood that Gaussian profile 304 and top hat profile 310 represent a cross-sectional energy distribution of the laser beam at their respective locations along the optical path. The beam of light produced by laser source 302 may be characterized as having Gaussian profile 304 up until it is received by beam shaping element 306, after which the beam of light may be characterized as having top hat profile 310. In other embodiments, beam shaping element 306 is not included and the laser light characterized as having Gaussian profile 304 is focused by focusing element 308 onto a beam spot for ablation of a tunnel through a metal foil.

The beam of light having the top hot profile 310 may then be focused onto a beam spot using focusing element 308. FIG. 3A illustrates how the focused beam of light has the top hat profile 310 due to beam shaping element 306. Focusing element 308 may represent one or more lenses arranged to focus the collimated light beam onto a beam spot for ablation of a tunnel through a metal foil, according to an embodiment.

Figure 3B:
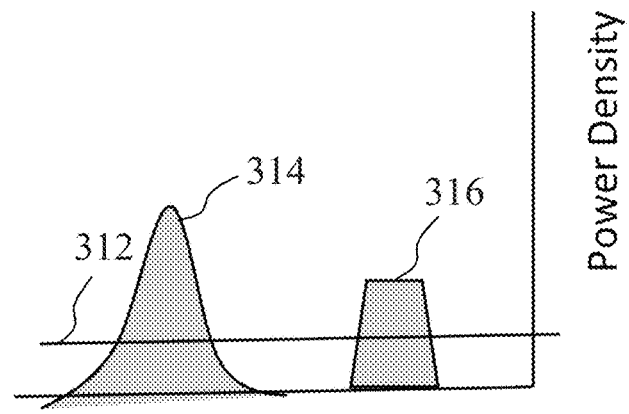
FIG. 3B illustrates a comparison between a Gaussian and a top-hat spatial profile.

FIG. 3B illustrates how the size of the resulting beam spot changes based on applied power density and energy profile of the beam. An ablation threshold 312 is indicated, which represents the power needed to start ablating through the metal. As the beam spot is focused to include a narrower region of Gaussian profile 314, there is a high power output at the center of the beam spot and lower power output at the edges of the beam spot. Although ablation can occur using this energy profile, the resulting tunnel diameter is more difficult to control, and the transfer of heat to the material is more significant, due to the substantial change in delivered power from the center of the beam spot to the edge of the beam spot.

At ablation threshold 312, top hot profile 316 provides a more uniform energy distribution across the beam spot, even as the beam spot is focused to include a narrower region of top hat profile 316. Thus, the tunnel diameter is easier to control, has higher repeatability, and a better overall profile than with Gaussian profile 314.

Figure 3C:
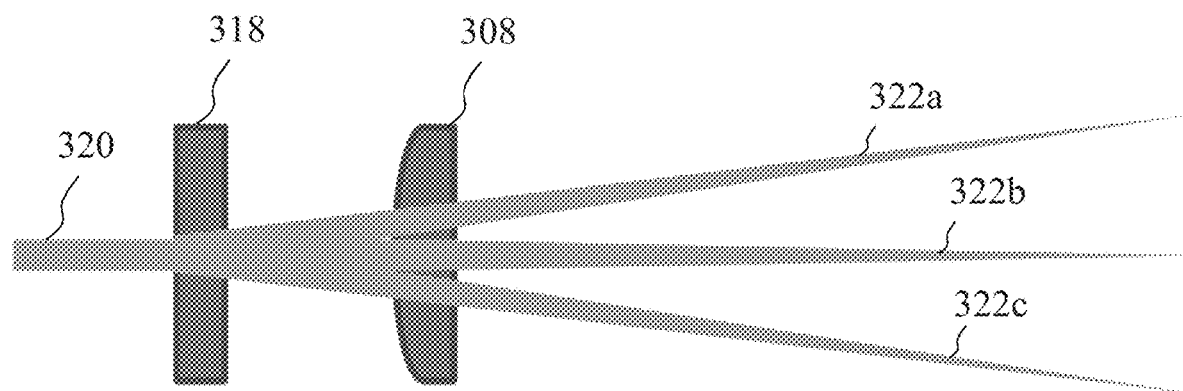
FIG. 3C illustrates a portion of the optical arrangement for generating multiple beam spots, according to an embodiment.

Only one output beam of light is illustrated in optical arrangement 300. However, in another embodiment, one or more optical elements may be included to split the beam of light having the top hat profile 310 into multiple beams of light that are each focused onto a metal foil at different beam spots. Beam splitting in this way may be achieved with diffractive optics to produce a linear or 2D array of beam spots having equal or nearly equal power densities. FIG. 3C illustrates an example of a diffractive splitting element 318, that may be used to split an incoming beam of light 320 into a plurality of light beams 322a-322c. Although only three light beams are illustrated here, it should be understood that any number of light beams may be generated. Diffractive splitting element 318 may be located optically downstream from shaping element 306 (if one is used), but optically upstream from focusing element 308.

Roller-Based Laser Drilling Technique

Figure 4A:
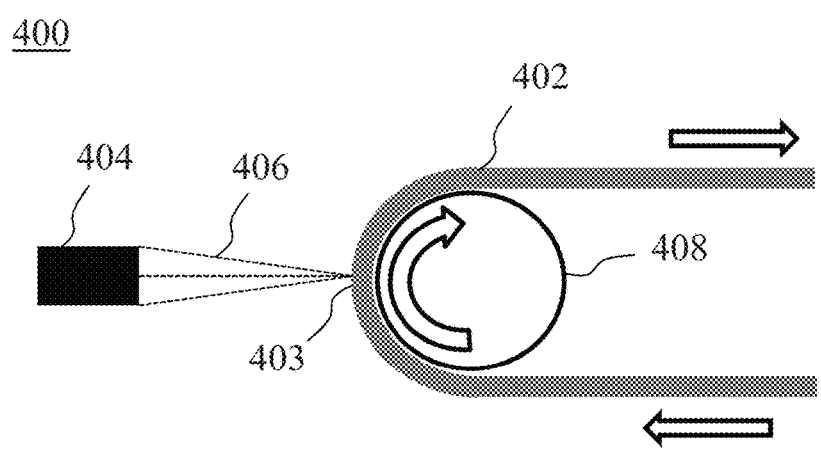
FIG. 4A illustrates a configuration for controlling laser ablation on a metal foil, according to an embodiment.

FIG. 4A illustrates a sheet roller arrangement 400 for ablating tunnels through a metal foil 402, according to an embodiment. Metal foil 402 may be used as an anode in an electrolytic capacitor, and may be an aluminum or tantalum foil. A laser head 404 outputs a beam of light 406 having a top hat profile at a beam spot towards a surface of metal foil 402. The term "beam spot" as used herein refers to a location of focused light from the perspective of the laser head. Laser head 404 may have an internal arrangement similar to optical arrangement 300. In one embodiment, more than one beam of light having a top hat profile is outputted from laser head 404.

Metal foil 408 is stretched over a roller 408 such that a foil portion 403 faces laser head 404, according to an embodiment. Metal foil 402 may be stretched over roller 408 at any angle. Furthermore, metal foil 402 may be placed around other rollers or spooled around other rollers that are not shown for clarity. The arrows provide an example movement of metal foil 402 around roller 408. With respect to laser head 404, metal foil would appear to move upward. This direction is arbitrary, and it should be understood that other examples may have metal foil 402 moving downward with respect to laser head 404 and around roller 408 in a counter-clockwise direction. Laser head 404 may be designed to scan in a direction that is perpendicular to the direction that metal foil 402 moves around roller 408 (as viewed from laser head 404), such that beam of light 406 ablates tunnels across a length of foil portion 403 (normal to the page in this illustration). This ablation method is illustrated in more detail in FIG. 4B.

Figure 4B:
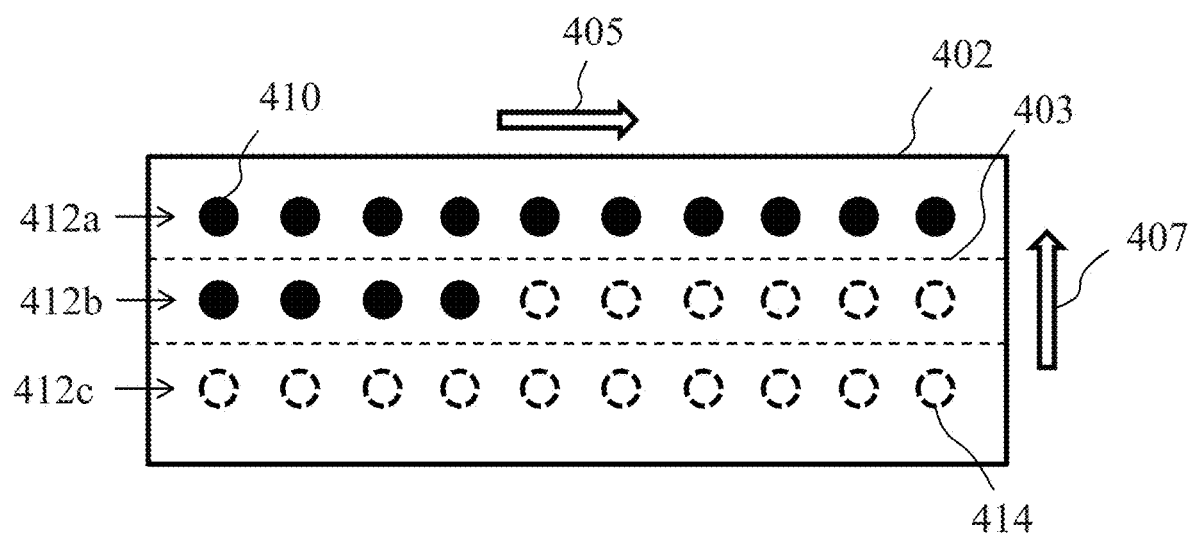
FIG. 4B illustrates an arrangement of tunnels on a metal foil formed via the configuration of FIG. 3A, according to an embodiment.

FIG. 4B illustrates a view of metal foil 402 as viewed from laser head 404, according to an embodiment. Metal foil 402 includes a plurality of etched tunnels 410 that are arranged in rows. Three example rows 412a-412c are illustrated in FIG. 4B, however, it should be understood that any number of rows of tunnels may be ablated in metal foil 402. In the illustrated example, laser head 404 is scanned in a first direction 405 across a length of metal foil 402 and pulses energy towards metal foil 402 at a given beam spot to form a tunnel 410. Anywhere between 20 and 500 pulses may be required at a given beam spot to punch through a thickness of metal foil 402 and form a tunnel. The laser power density being applied may be between $7.8 \times 10^8$ W/cm$^2$ and $4 \times 10^{10}$ W/cm$^2$. In another example, the laser power density being applied is greater than $7.8 \times 10^8$ W/cm$^2$. Once a tunnel has been formed, laser head 404 is laterally scanned in the first direction 405 and pulses energy towards metal foil 402 at a new beam spot to form the next tunnel.

In the illustrated example, the entire first row 412a of tunnels 410 have been ablated by beam of light 406. At this point, metal foil 402 may be moved in a second direction 407, such that the next row 412b is present as foil portion 403. The laser then proceeds to form tunnels in row 412b.

The example illustrated in FIG. 4B shows that the laser has formed tunnels partially along the length of row 412b, but has not yet formed tunnels at locations 414 marked with broken circles. Additionally, the entire next row 412c includes all locations 414 where tunnels have not yet been formed. Once each location 414 across row 412b has been ablated to form a tunnel, metal foil 402 may again be moved in the second direction 407 to present row 412c as foil portion 403 to have its locations 414 ablated to form more tunnels.

Figure 4C:
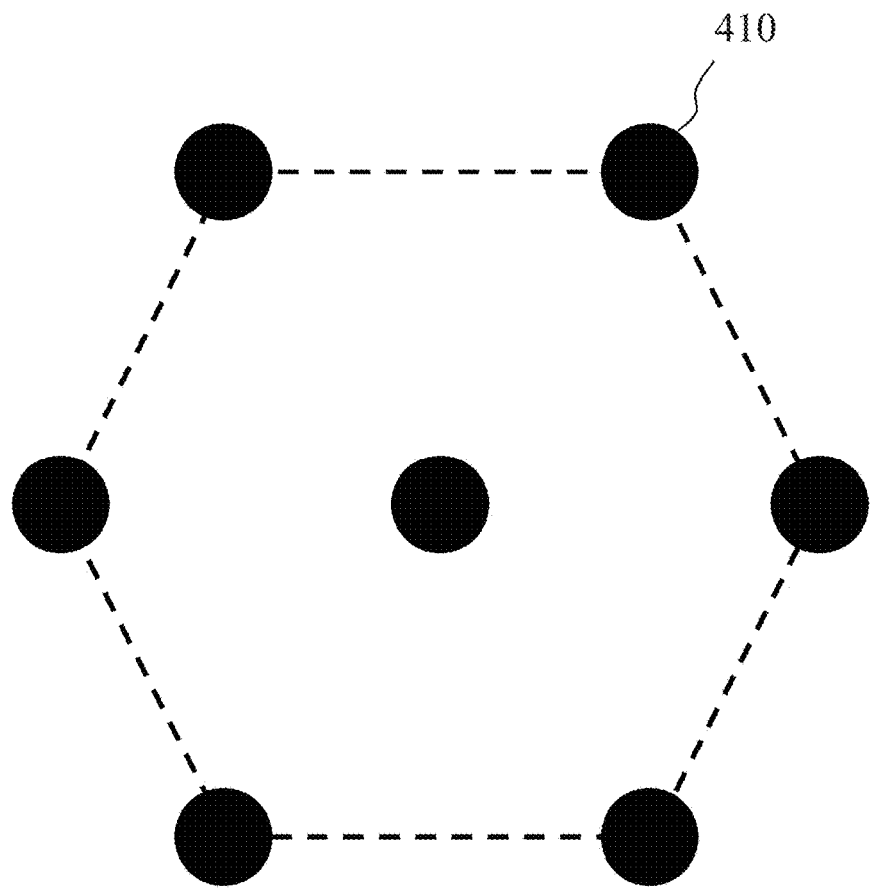
FIG. 4C illustrates a close packed hexagonal array arrangement of tunnels, according to an embodiment.

It should be understood that many alterations may be made to how various elements move and when ablation takes place without deviating from the scope or sprit of the embodiments described herein. For example, laser head 404 may scan along the length of metal foil 402 in the first direction 405, forming tunnels at each beam spot as it does, and then scan back across the length of metal foil 402 in the opposite direction to form tunnels in the next row. In another example, roller 408 is laterally shifted in the first direction 405 while laser head 404 remains stationary. Laser head 404 may be controlled to form tunnels 410 having any desired arrangement. For example, the packing density of tunnels 410 may be a close packed hexagonal array arrangement, as illustrated in FIG. 4C. The overall tunnel density may be on the order of 20 to 50 million tunnels per cm$^2$. Furthermore, the diameters of the tunnels may be changed by altering the beam spot size. Since the beam has a top-hat energy profile, changing the beam spot size would not adversely affect the ability for the laser beam to punch through the thickness of the foil and form the tunnel. In another example, larger diameter tunnels may be formed by clustering beam spots close enough together that they overlap.

In an embodiment, multiple beam spots may be formed on the surface of metal foil 402 along a length of foil portion 403. In this way, multiple tunnels may be ablated at substantially the same time. In the example illustrated, the first four tunnels of row 412b may be ablated at the same time by projecting four beams of light and creating four beam spots linearly arranged in the first direction 405. Providing multiple beams would substantially decrease the time it takes to ablate tunnels across the surface of metal foil 402.

Figure 5:
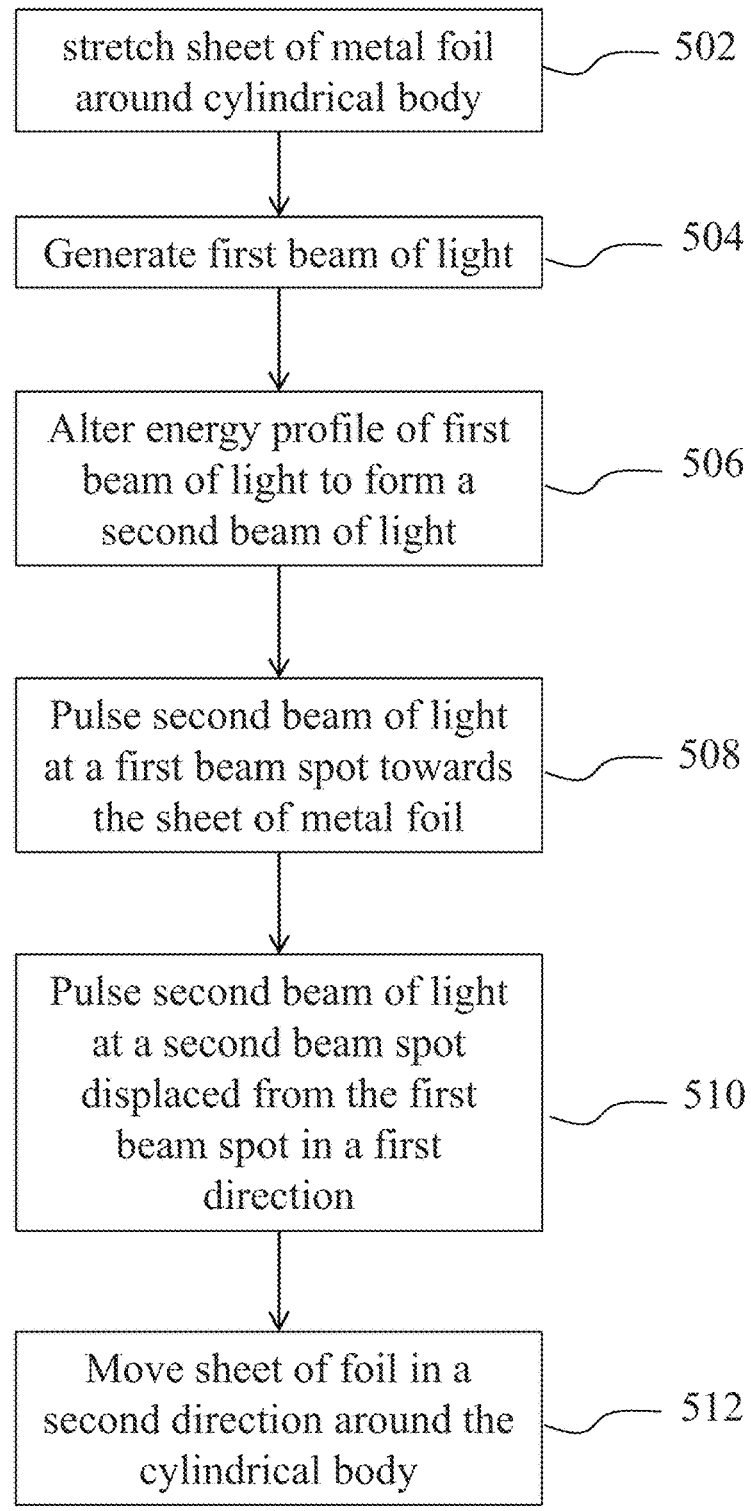
FIG. 5 illustrates a flow chart of a method of forming tunnels through a metal foil, according to an embodiment.

FIG. 5 provides an example method 500 of ablating tunnels in an anode foil. In one example, the anode foil is an aluminum foil or a tantalum foil that is used as the anode within a capacitor or battery. Any of the step(s) of method 500 may be performed using sheet roller arrangement 400. Furthermore, the various steps of method 500 may be performed in any order.

At block 502, a sheet of metal foil is stretched around a cylindrical body. The stretching may cause a portion of the foil to lay substantially flat across a length of the foil, where the portion is aligned with a laser head that delivers the pulses of light to ablate the foil.

At block 504, a first beam of light is generated. The first beam of light may be a beam of laser light having a wavelength between 200 nm and 700 nm. The first beam of light may have a Gaussian energy profile and may be collimated to form a more focused beam. A standard optical collimator may be used to collimate the laser light generated from a source, as would be understood by those skilled in the art.

At block 506, the Gaussian energy profile of the first beam of light is altered to form a second beam of light having a top hat profile. The energy profile may be altered using a beam shaping element, such as a fused silica diffractive optic.

At block 508, the second beam of light having the top hat profile is pulsed at a first beam spot towards the sheet of metal foil. The second beam of light may also be focused onto the first beam spot using one or more lenses, thus affecting the diameter of the beam spot. The second beam of light may have a pulse rate between 10 picoseconds and 100 femtoseconds, and may pulse between 20 and 500 times to punch through a thickness at any given spot of the metal foil.

At block 510, the second beam of light is pulsed at a second beam spot that is displaced from the first beam spot in a first direction. The first direction may be across a length of the metal foil stretched around the cylindrical body. The second beam of light is delivered from a laser head that may laterally move between a first position, where the second beam of light is pulsed at the first beam spot, and a second position where the second beam of light is pulsed at the second beam spot. It should be understood that this action may be repeated until tunnels have been formed across an entire length of the metal foil.

At block 512, the sheet of metal foil is moved in a second direction around the cylindrical body. This second direction is substantially perpendicular to the first direction when viewed from the perspective of the laser head. The sheet of metal foil may move in the second direction after tunnels have been formed across a length of the metal foil, in order to form more tunnels across a new section of the metal foil.

Rotary Laser Drilling Technique

Figure 6A:
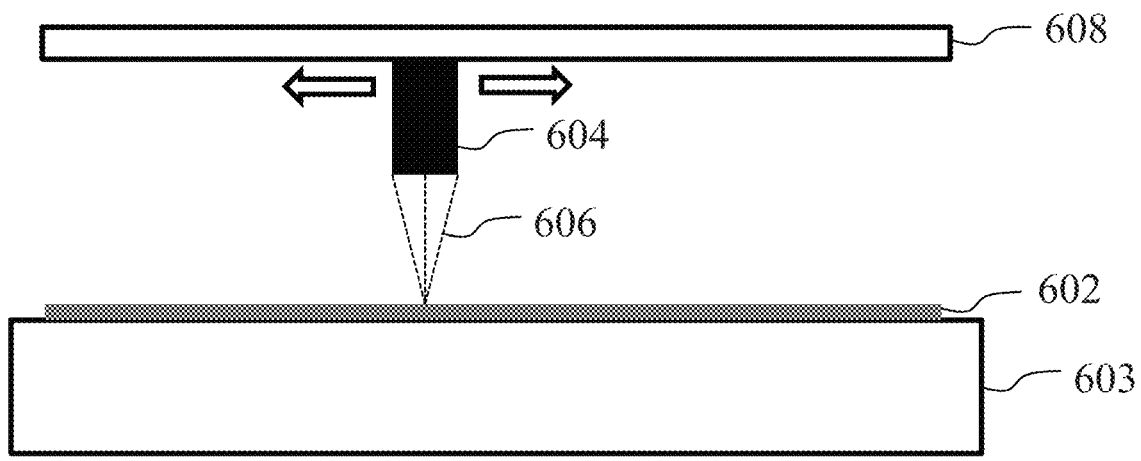
FIG. 6A illustrates another configuration for controlling laser ablation on a metal foil, according to an embodiment.

FIG. 6A illustrates a laser ablation technique using a rotary arrangement 600 for ablating tunnels through a metal foil 602, according to an embodiment. Metal foil 602 may be used as an anode in an electrolytic capacitor, and may be an aluminum or tantalum foil. Metal foil 602 is secured to a rotary actuator 603, such that its major surface faces a laser head 604, and is designed to rotate metal foil 602 about an axis substantially normal to its major surface. Metal foil 602 may be aligned on rotary actuator 603 such that the axis passes through a center of metal foil 602. Metal foil 602 may be any shape.

A laser head 604 outputs a beam of light 606 having a top hat profile at a beam spot towards a surface of metal foil 602. Laser head 604 may have an internal arrangement similar to optical arrangement 300. In one embodiment, more than one beam of light having a top hat profile is outputted from laser head 604.

Laser head 604 may be coupled to a track 608, such that laser head 604 can linearly translate along a direction as indicated by the white arrows in FIG. 6A. This direction may be a radial direction with respect to the rotating metal foil 602. This arrangement may be analogous to how a compact disk (CD) is read.

As metal foil 602 is being rotated by rotary actuator 603, laser head 604 pulses beam of light 606 at a beam spot at a pulse rate between 10 picoseconds and 100 femtoseconds, according to an embodiment. Rotary actuator may be designed to rotate metal foil 602 between 1000 RPM and 2000 RPM. Although the beam spot itself remains stationary, metal foil 602 rotates beneath it, such that successive pulses from laser head 604 hit different areas circumferentially separated from one another on metal foil 602. However, if the pulses are timed correctly with the RPM of the rotary actuator, then the spacing between the tunnels being formed on metal foil 602 should be consistent, and the same areas will be hit over and over again by the pulses as metal foil 602 is rotated. It may require between 20 and 500 pulses at any given spot on metal foil 602 to punch through a thickness of metal foil 602 and form a tunnel. The laser power density being applied may be between $7.8 \times 10^8$ $W/cm^2$ and $4 \times 10^{10}$ $W/cm^2$.

Figure 6B:
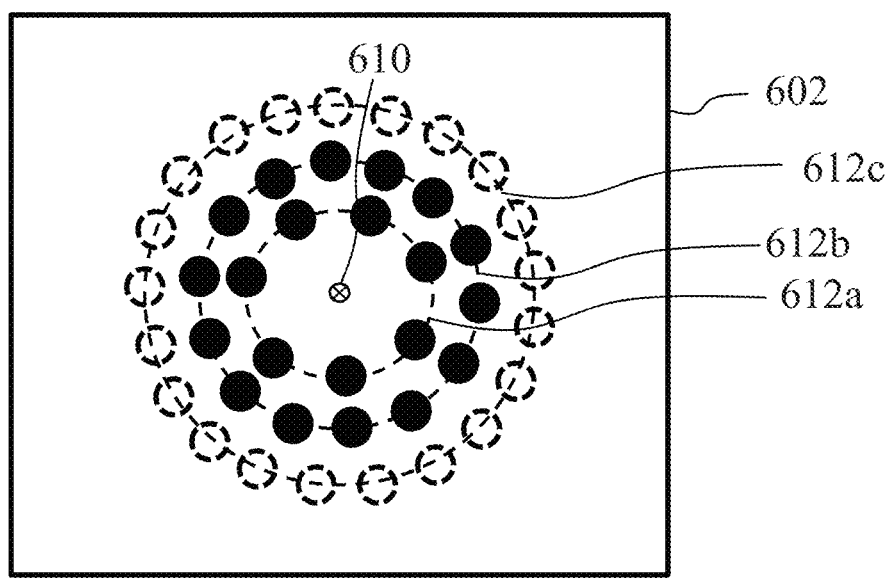
FIG. 6B illustrates an arrangement of tunnels on a metal foil formed via the configuration of FIG. 5A, according to an embodiment.

FIG. 6B illustrates a top-down view of metal foil 602, according to one example. Metal foil 602 rotates about an axis 610 passing through a center of metal foil 602. According to an embodiment, laser head 604 delivers pulses along various tracks 612a-612c. Only three tracks are illustrated here for clarity, however, it should be understood that any number of tracks may be used to ablate tunnels across the entire surface of metal foil 602. After tunnels are formed along one track, laser head 604 moves radially towards an adjacent track, where subsequent pulses now form tunnels along the adjacent track.

In the example illustrated in FIG. 6B, tunnels (indicated by black circles) have been formed along track 612a followed by track 612b. At this point, laser head 604 would move radially outwards and align with track 612c to begin ablating tunnels at the locations marked with circles having dashed lines. As laser head 604 moves radially outwards, the pulse rate of the laser, or the revolution speed of metal foil 602, or both, may be adjusted to ensure equal spacing between each of the formed tunnels. Due to the rotation of metal foil 602, successive pulses from laser head 604 ablate portions that are circumferentially separated from one another along a given track as illustrated in FIG. 6B.

Laser head 604 may be controlled to form the tunnels on metal foil 602 having any desired arrangement. For example, the packing density of the tunnels may be close packed hexagonal. The overall tunnel density may be on the order of 20 to 50 million tunnels per $cm^2$. Furthermore, the diameters of the tunnels may be changed by altering the beam spot size. Since the beam has a top-hat energy profile, changing the beam spot size would not adversely affect the ability for the laser beam to punch through the thickness of the foil and form the tunnel. In another example, larger diameter tunnels may be formed by clustering beam spots close enough together that they overlap.

In an embodiment, multiple beam spots may be formed on the surface of metal foil 602. In this way, multiple tunnels may be ablated at substantially the same time. The multiple beam spots may be arranged along the radial direction, such that each beam spot lies in a different track. In another example, the multiple beam spots are circumferentially spaced from each other around a given track, such that each beam spot ablates a portion of metal foil 602 arranged in the given track. Providing multiple beams would substantially decrease the time it takes to ablate tunnels across the surface of metal foil 602.

Figure 7:
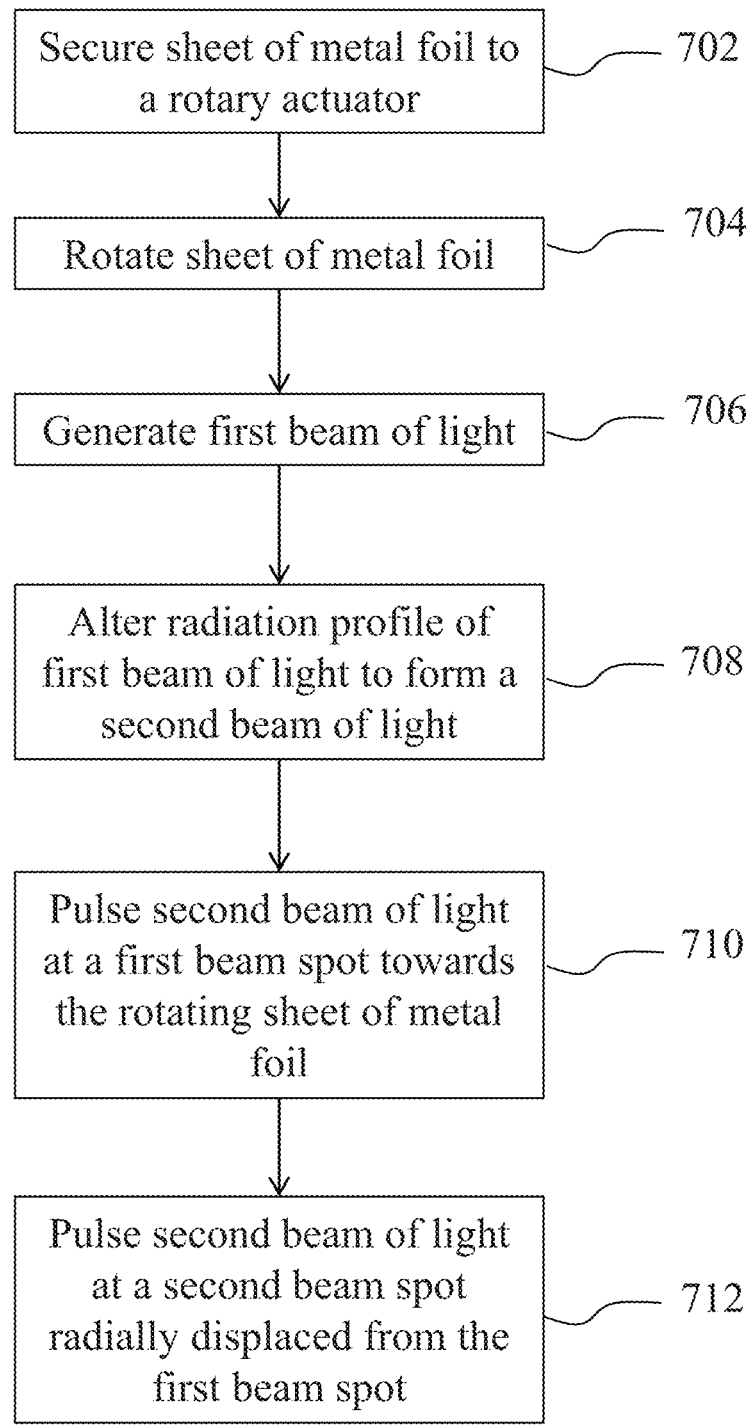
FIG. 7 illustrates a flow chart of another method of forming tunnels through a metal foil, according to an embodiment.

FIG. 7 provides an example method 700 of ablating tunnels in an anode foil. In one example, the anode foil is an aluminum foil or a tantalum foil that is used as the anode within a capacitor or battery. Any of the step(s) of method 700 may be performed using rotary arrangement 600. Furthermore, the various steps of method 700 may be performed in any order.

At block 702, a sheet of metal foil is secured to a rotary actuator. The sheet of metal foil may be secured using any known means, such as a clamp or an adhesive. In one example, the sheet of metal foil is electrostatically clamped to the rotary actuator.

At block 704, the sheet of metal foil is rotated. The metal foil may be rotated at a speed between 1000 RPM and 2000 RPM. Rotation may occur about an axis passing through a center of the major surface of the sheet of metal foil. The rotating sheet may be any shape, and is thus not required to have a circular shape.

At block 706, a first beam of light is generated. The first beam of light may be a beam of laser light having a wavelength between 200 nm and 700 nm. The first beam of light may have a Gaussian energy profile and may be collimated to form a more focused beam.

At block 708, the Gaussian energy profile of the first beam of light is altered to form a second beam of light having a top hat profile. The energy profile may be altered using a beam shaping element, such as a fused silica diffractive optic.

At block 710, the second beam of light having the top hat profile is pulsed at a first beam spot towards the rotating sheet of metal foil. The second beam of light may also be focused onto the beam spot using one or more lenses, thus affecting the diameter of the beam spot. The second beam of light may have a pulse rate between 10 picoseconds and 100 femtoseconds, and may pulse between 20 and 500 times at a given location on the sheet of metal foil to form a tunnel at that location. Although the beam spot remains stationary, each successive pulse of the second beam of light strikes a different portion of the metal foil due to its rotation.

At block 712, the second beam of light is pulsed at a second beam spot that is radially displaced from the first beam spot. The second beam of light is delivered from a laser head that may laterally move between a first position, where the second beam of light is pulsed at the first beam spot, and a second position where the second beam of light is pulsed at the second beam spot. Although the second beam spot remains stationary, each successive pulse of the second beam of light strikes a different portion of the metal foil due to its rotation. It should be understood that this action may be repeated until tunnels have been formed across the surface of the metal foil.

Aluminum Anode Foil

As described in the embodiments above, the anode foil through which the tunnels are formed may be an aluminum foil. The tunnels formed in aluminum may be further widened and have impurities removed using a solution of polystyrenesulfonic acid (PSSA). The PSSA improves the foil capacitance by protecting the foil surface from erosion and pitting. The tunnel widening procedure is described in more detail in co-owned U.S. Pat. Nos. 6,858,126, 6,802,954, or 8,535,507.

Once a number of aluminum foils have been ablated to form densely packed tunnels, the aluminum foils are stacked together to form an anode stack and are hydrated for between 4 and 20 minutes to form an anode layer on the outside of the exposed aluminum surface. Afterwards, the hydrated anode foils are aged using a formation voltage between about 450 volts and 510 volts, and are assembled into a capacitor, as illustrated, for example, in FIG. 1, according to an embodiment.

Figure 8:
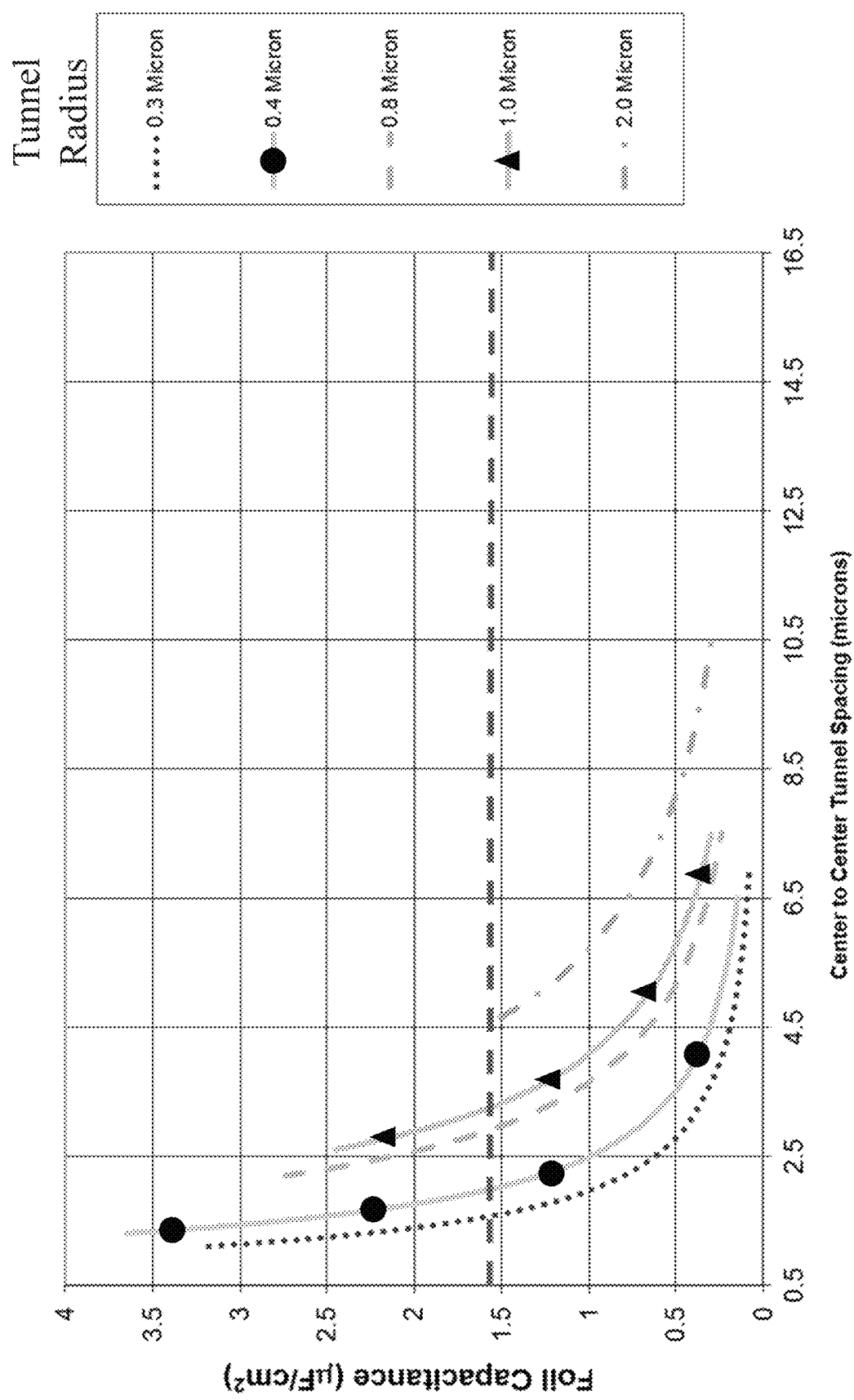
FIG. 8 is a graph of simulated capacitance of an aluminum foil based on tunnel separation and tunnel radius.

FIG. 8 is a graph of simulated aluminum foil capacitance that may be achieved for different tunnel radii and packing density (measured as center to center tunnel spacing.) The simulation was performed for an aluminum foil that is aged at 450 volts and has tunnels that are arranged in a close packed hexagonal array. As can be seen from the graph, tighter packed tunnels and a smaller tunnel radius result in a higher overall foil capacitance. There is a limit imposed on the capacitance based on when the center to center spacing approached the tunnel diameter. Also, very small tunnels, such as those having a tunnel radius of 0.3 microns, do not achieve the greatest possible foil capacitance, even at their highest packing density, due to transport limitations of the electrolyte. The horizontal dashed line at about 1.55 $\mu F/cm^2$ represents the current foil capacitance achieved for an aluminum foil when using the standard electrochemical etching process at the same aging voltage of 450 volts.

Tantalum Anode Foil

As described in the embodiments above, the anode foil through which the tunnels are formed may be a tantalum foil. Typically, etching tunnels though tantalum requires highly caustic chemicals (such as hydrofluoric acid). This also required the use of sintered tantalum, since it was too difficult to form an oxide in the tunnels created in a tantalum foil. By using the laser ablation embodiments described herein, a sintered tantalum piece is no longer required because tunnels of consistent diameter and spacing may be formed in a tantalum foil, thus making it easier to form the oxide on the tunnel walls.

Due to the dielectric constant of tantalum pentoxide being 2.6 times that of aluminum oxide, the tunnel spacing and tunnel diameter on a tantalum foil may be larger than those on an aluminum foil and still achieve a high capacitance per area. For example, a tantalum foil with tunnels having a diameter of 6 microns and a 7 micron center to center spacing can achieve a very high foil capacitance of about 40% higher than a similar aluminum foil. This may lead to an energy density of a capacitor being between 5 to 6 J/cc, or greater than 8 J/cc.

Once a number of tantalum foils have been ablated to form densely packed tunnels, the tantalum foils are cleaned to remove any residue from the tunnels. Any cleaning method may be used as would be known by those skilled in the relevant art. For example, an ultrasonic bath of deionized (DI) water may be used to remove impurities from the tunnels. Afterwards, the stack of tantalum foils are aged using a formation voltage of about 350 volts, and are assembled into a capacitor, as illustrated, for example, in FIG. 1, according to an embodiment.

Figure 9:
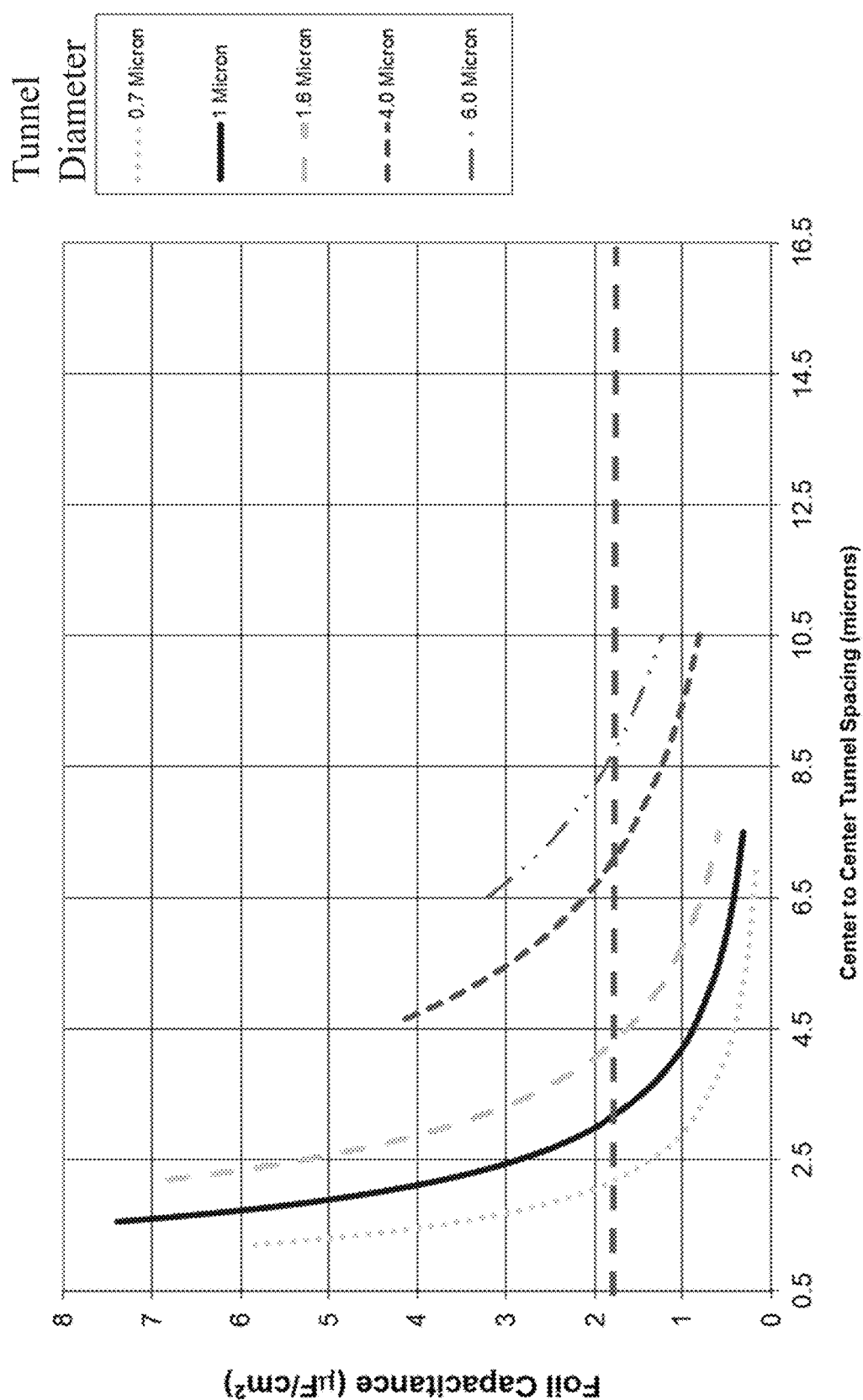
FIG. 9 is a graph of simulated capacitance of a tantalum foil based on tunnel separation and tunnel diameter.

FIG. 9 is a graph of simulated tantalum foil capacitance that may be achieved for different tunnel diameters and packing density (measured as center to center tunnel spacing). The simulation was performed for a tantalum foil that is aged at 350 volts and has tunnels that are arranged in a close packed hexagonal array. As can be seen from the graph, tighter packed tunnels and a smaller tunnel diameter result in a higher overall foil capacitance. The resulting foil capacitance that can be achieved from the tantalum foil as illustrated in the graph from FIG. 9 is higher than that achieved from the aluminum foil as illustrated in the graph from FIG. 8.

Very small tunnels, such as those having a tunnel diameter of 0.7 microns, do not achieve the greatest possible foil capacitance, even at their highest packing density, due to transport limitations of the electrolyte. The horizontal dashed line at about 1.8 $\mu F/cm^2$ represents the current foil capacitance achieved for an aluminum foil when using the standard electrochemical etching process at the same aging voltage of 350 volts.

It is to be appreciated that the Detailed Description section, and not the Summary and Abstract sections, is intended to be used to interpret the claims. The Summary and Abstract sections may set forth one or more but not all exemplary embodiments of the present system and method as contemplated by the inventors, and thus, are not intended to limit the present method and system and the appended claims in any way.

Moreover, while various embodiments of the present system and method have been described above, it should be understood that they have been presented by way of example, and not limitation. It will be apparent to persons skilled in the relevant art(s) that various changes in form and detail can be made therein without departing from the spirit and scope of the present system and method. Thus, the present system and method should not be limited by any of the above described exemplary embodiments, but should be defined only in accordance with the following claims and their equivalents.

In addition, it should be understood that the figures, which highlight the functionality and advantages of the present system and method, are presented for example purposes only. Moreover, the steps indicated in the exemplary system(s) and method(s) described above may in some cases be performed in a different order than the order described, and some steps may be added, modified, or removed, without departing from the spirit and scope of the present system and method.

What is claimed is:

1. An electrolytic capacitor, comprising:
a housing;
one or more anodes disposed within the housing, wherein at least one of the anodes comprises a metal foil that includes a first tunnel region where first tunnels extend through the metal foil in a first ordered close packed hexagonal array arrangement and the first tunnels each have a first diameter, and
second tunnels extending through the metal foil in a second ordered arrangement,
each of the second tunnels having a second diameter greater than the first diameter,
the second tunnels being distributed through the first tunnel region such that different portions of the first tunnel region surround each of the second tunnels;
one or more cathodes disposed within the housing;
one or more separators disposed between an adjacent anode and cathode; and
an electrolyte disposed around the one or more anodes, one or more cathodes, and one or more separators within the housing.

2. The electrolytic capacitor of claim 1, wherein each of the one or more anodes comprises an aluminum foil.

3. The electrolytic capacitor of claim 2, wherein the first diameter is between 1 micron and 3 microns, and the second diameter is between 5 microns and 10 microns.

4. The electrolytic capacitor of claim 1, wherein each of the one or more anodes comprises a tantalum foil.

5. The electrolytic capacitor of claim 4, wherein the first diameter is between 1 micron and 5 microns, and the second diameter is between 5 microns and 10 microns.

6. The electrolytic capacitor of claim 1, wherein the second ordered arrangement is a close packed hexagonal array arrangement.

7. The electrolytic capacitor of claim 1, wherein the one or more anodes, one or more cathodes, and one or more separators are arranged in a stacked formation.

8. The electrolytic capacitor of claim 1, wherein the second tunnels include neighboring tunnels, the neighboring tunnels are adjacent to each other on the foil and have a portion of the first tunnels located between the neighboring tunnels.

9. The electrolytic capacitor of claim 1, wherein the first tunnel region is continuous between the second tunnels.

10. The electrolytic capacitor of claim 1, wherein each of the second tunnels is defined by the first tunnel region.

11. An electrolytic capacitor, comprising:
a housing;
one or more anodes disposed within the housing, wherein at least one of the anodes comprises a metal foil that includes a first tunnel region where first tunnels extend through the metal foil in a first ordered close packed hexagonal array arrangement, and
each of the first tunnels having a first diameter, and
second tunnels extending through the metal foil and the second tunnels each have a second diameter greater than the first diameter,
the second tunnels including neighboring tunnels, the neighboring tunnels being second tunnels that are adjacent to each other on the foil and have a portion of the first tunnels located between the neighboring tunnels;
one or more cathodes disposed within the housing;
one or more separators disposed between an adjacent anode and cathode; and
an electrolyte disposed around the one or more anodes, one or more cathodes, and one or more separators within the housing.

12. The electrolytic capacitor of claim 11, wherein each of the one or more anodes comprises an aluminum foil.

13. The electrolytic capacitor of claim 12, wherein the first diameter is between 1 micron and 3 microns, and the second diameter is between 5 microns and 10 microns.

14. The electrolytic capacitor of claim 11, wherein each of the one or more anodes comprises a tantalum foil.

15. The electrolytic capacitor of claim 14, wherein the first diameter is between 1 micron and 5 microns, and the second diameter is between 5 microns and 10 microns.

16. The electrolytic capacitor of claim 11, wherein the second tunnels are arranged in a close packed hexagonal array arrangement.

17. The electrolytic capacitor of claim 11, wherein the one or more anodes, one or more cathodes, and one or more separators are arranged in a stacked formation.

18. The electrolytic capacitor of claim 11, wherein the first tunnel region is continuous between the second tunnels.

19. The electrolytic capacitor of claim 11, wherein the second tunnels are each defined by the first tunnel region.

* * * * *